United States Patent [19]
Van Alstine

[11] Patent Number: 4,940,594
[45] Date of Patent: Jul. 10, 1990

[54] METHOD FOR PROCESSING CHEWING GUM

[75] Inventor: Terrance L. Van Alstine, Palatine Bridge, N.Y.

[73] Assignee: Nabisco Brands, Inc., East Hanover, N.J.

[21] Appl. No.: 394,028

[22] Filed: Aug. 15, 1989

Related U.S. Application Data

[62] Division of Ser. No. 179,467, Apr. 8, 1988, Pat. No. 4,882,172.

[51] Int. Cl.$^5$ .............................................. A23G 7/00
[52] U.S. Cl. ........................................ 426/231; 426/5; 426/516; 426/517; 426/518
[58] Field of Search ..................... 426/3, 5, 231, 232, 426/516, 517, 518, 524; 53/450; 425/113

[56] References Cited

U.S. PATENT DOCUMENTS

| | | | |
|---|---|---|---|
| 1,852,005 | 4/1932 | Garbutt | 426/516 |
| 1,953,295 | 4/1934 | Garbutt | 426/5 |
| 2,197,919 | 4/1940 | Bowman | 426/4 |
| 2,256,190 | 9/1941 | Bowman | 426/5 |
| 3,570,417 | 3/1971 | Herrmann et al. | 426/5 |
| 3,644,169 | 2/1972 | Phillips | 426/5 |
| 3,857,963 | 12/1974 | Graff et al. | 426/5 |
| 3,969,513 | 7/1976 | Canonne | 426/517 |
| 4,117,645 | 10/1978 | Phillips | 426/5 |
| 4,329,369 | 5/1982 | Tezuka et al. | 426/5 |
| 4,536,146 | 8/1985 | Hernandez et al. | 425/297 |
| 4,543,769 | 10/1985 | Schmitz | 53/450 |
| 4,555,407 | 11/1985 | Kramer et al. | 426/5 |
| 4,579,738 | 4/1986 | Cherukuri et al. | 426/3 |
| 4,581,234 | 4/1986 | Cherukuri et al. | 426/3 |
| 4,587,125 | 5/1986 | Cherukuri et al. | 426/3 |
| 4,656,039 | 4/1987 | Weiss et al. | 426/5 |

Primary Examiner—George Yeung

[57] ABSTRACT

A method and system for processing a chewing gum composition. The system comprises segment forming apparatus to form the gum into a multitude of segments, and a conveyor to receive the gum segments from the segment forming apparatus and to move those gum segments along a path. The system further comprises a plurality of extruders located along the conveyor to receive the gum segments therefrom and to extrude those gum segments into ropes of gum; and a plurality of wrapping units to receive those ropes of gum, to cut each rope into a multitude of pieces and to wrap those pieces.

10 Claims, 6 Drawing Sheets

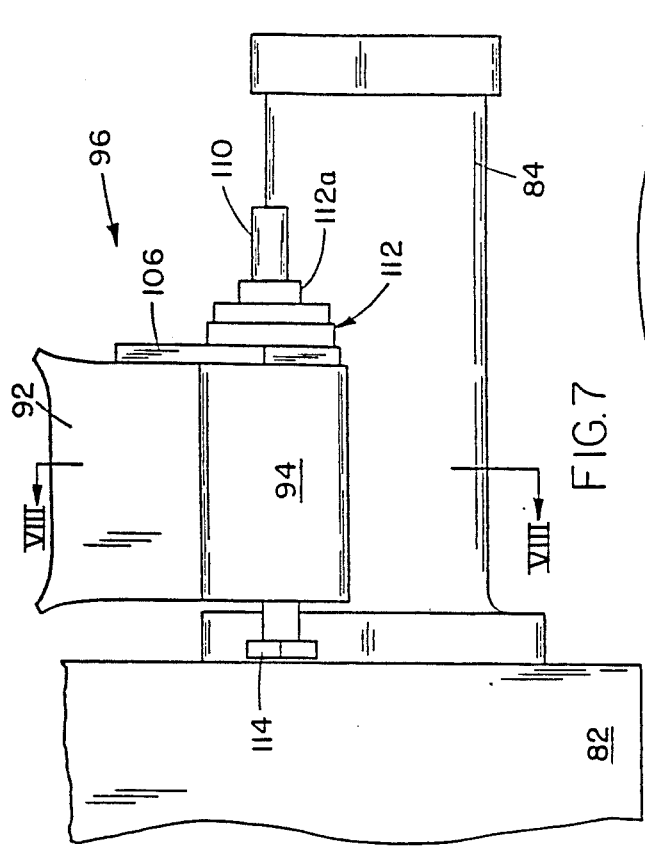
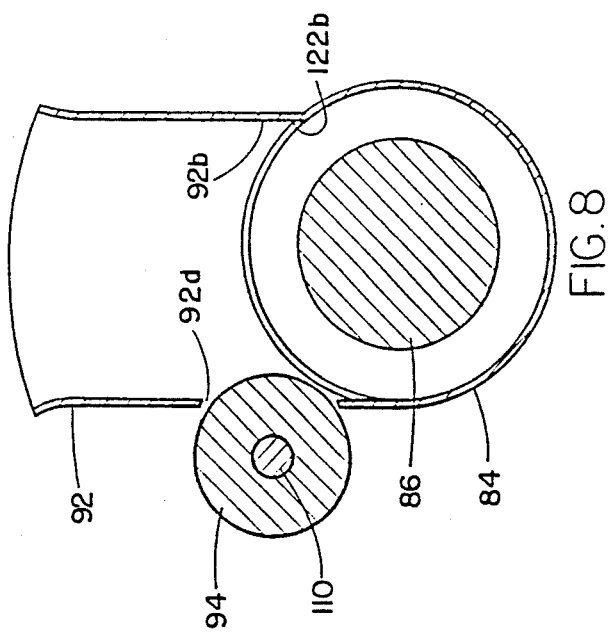
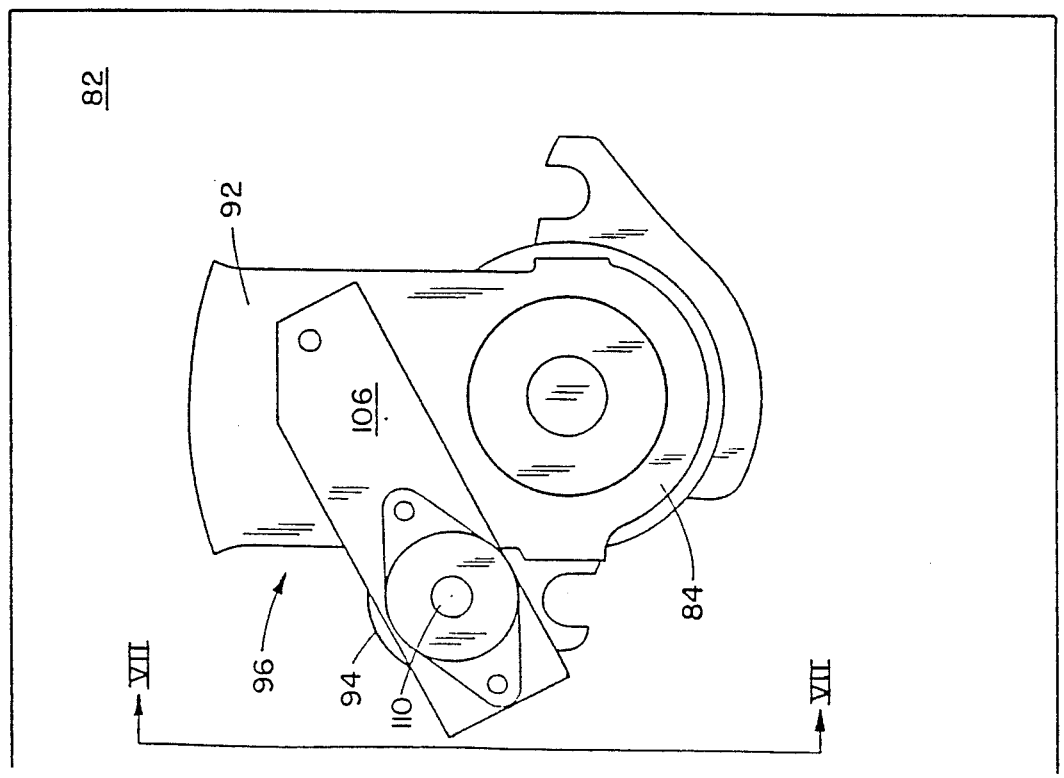
FIG. 7
FIG. 8
FIG. 6

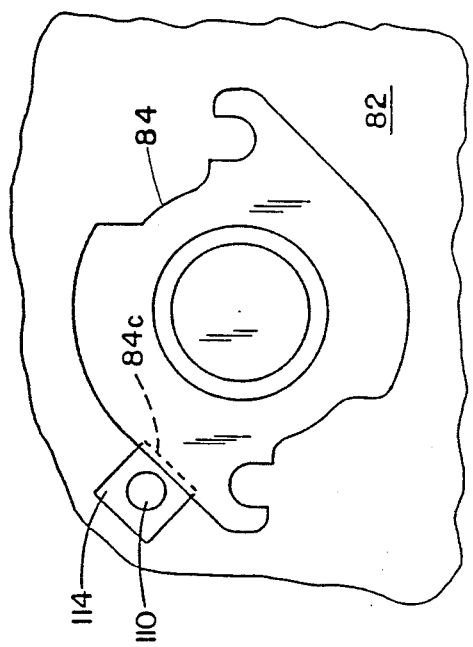
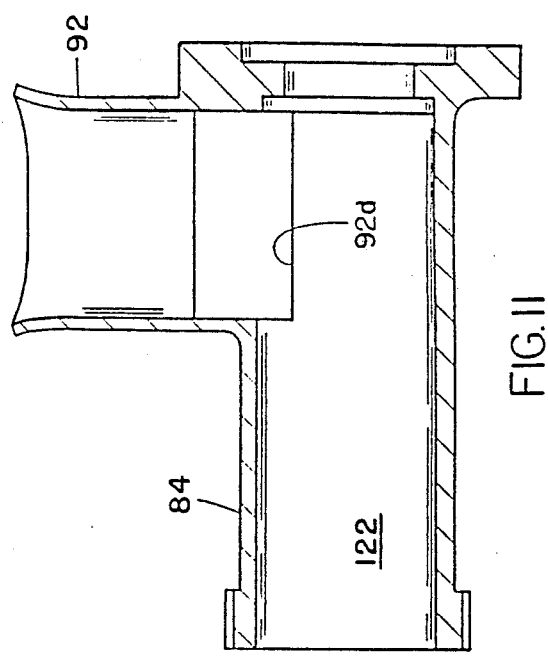
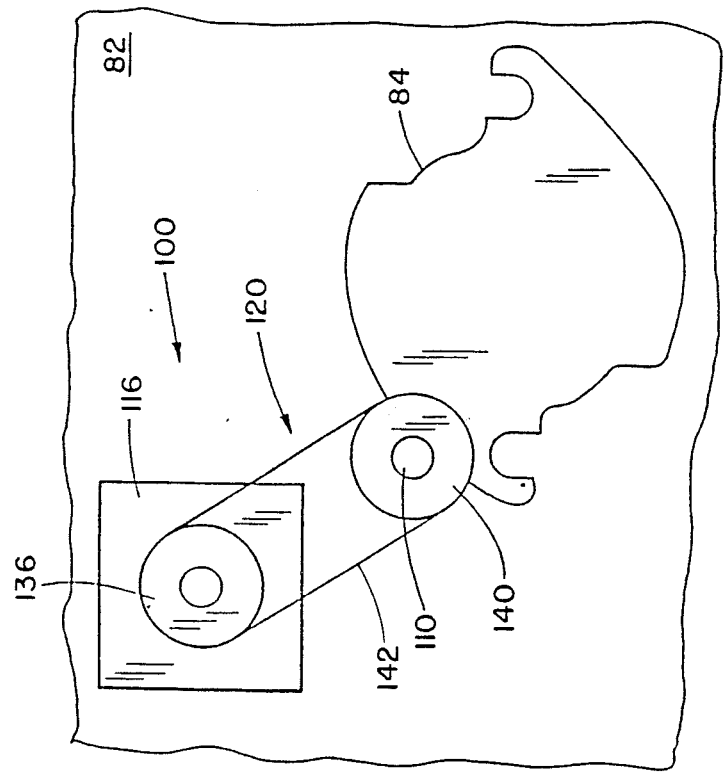

4,940,594

METHOD FOR PROCESSING CHEWING GUM

This is a divisional of copending application Ser. No. 179,467 filed on Apr. 8, 1988 now U.S. Pat. No. 4,882,173.

BACKGROUND OF THE INVENTION

This invention generally relates to methods and systems for processing chewing gum, and more specifically, to a method and system where a gum composition is extruded into a rope, and the rope is subsequently cut into small pieces, which are then wrapped.

Various large scale, mass production systems have been developed to form individually wrapped chewing gum pieces. With one conventional system, the chewing gum ingredients are mixed together in a kettle or similar device and cooked or baked to form loaves of chewing gum material. The loaves are then fed to an extruder, which extrudes a multitude of elongated ropes. These ropes are usually powdered to improve their workability, and cut into segments. The rope segments are then carried to a work station adjacent a wrapping machine and reconnected together to form a new continuous rope. The new rope is fed through a pre-sizer, which changes the vertical cross-sectional shape of the rope from circular to square, and then fed to the wrapping machine, which cuts the rope into small pieces and individually wraps each piece. While this procedure has proven to be very efficient and productive, it is believed that it can be improved upon in several respects.

For instance, the prior art system is relatively labor intensive in that it requires one worker to transport the rope segments from a first work area or station adjacent the extruder to a second work area or station adjacent the wrapping machine, and a second worker is normally required at the latter work station to reconnect the rope segments. This relatively large number of workers increases the cost of operating the system and the cost of producing the wrapped chewing gum pieces.

SUMMARY OF THE INVENTION

An object of this invention is to improve methods and systems for processing chewing gum.

Another object of the present invention is to provide a system for processing chewing gum with a multitude of gum wrapping machines and a multitude of gum extruders and to match the extruders with the wrapping machines on a one-to-one basis.

A further object of this invention is to cut a chewing gum composition into a multitude of segments and to feed those segments, via a single conveyor system, to a multitude of extruders, each of which extrudes one continuous rope of gum.

Still another object of the present invention is to circulate segments of chewing gum around a closed path past a group of gum extruders, to feed segments of gum from that closed path to the extruders, and to recirculate around the closed path any segments of gum not fed to an extruder.

These and other objectives are attained with a system for processing a chewing gum composition, and comprising gum segment forming means to form the gum into a multitude of segments; and conveyor means to receive the gum segments from the gum segment forming means and to move those gum segments along a path. The system further comprises a plurality of extruders located along the conveyor means to receive the gum segments therefrom and to extrude those gum segments into ropes of gum; and a plurality of wrapping means to receive those ropes of gum, to cut each rope into a multitude of pieces and to wrap these pieces.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 6 is a front view of the extruder.

FIG. 7 is a side view of a portion of the extruder, taken along line VII-VII of FIG. 6.

FIG. 8 is a cross-sectional view of a front portion of the extruder, taken along line VII-VII of FIG. 7.

FIG. 9 shows a detail of the extruder and is taken along lines IX-IX of FIG. 5.

FIG. 10 shows another detail of the extruder and is taken along line X-X of FIG. 5.

FIG. 11 is a side, cross-sectional view of a head of the extruder.

DETAILED DESCRIPTION OF THE PREFERRED EMBODIMENTS

In conventional chewing gum processes, a gum base and plasticizer are initially kneaded in baker type kneaders; and once the gum base has become a viscous melt, additional ingredients, such as sugar, rework, artificial colorings and the like are mixed into the melt. The mixing step usually involves first adding about one tenth of the total sugar and a starch hydrolyzate such as corn syrup and thoroughly mixing those ingredients, and then the remaining sugar is added and thoroughly mixed in. The flavoring is typically added last so that the flavoring is only mixed into the chewing gum paste for about one to three minutes. After the chewing gum paste has been thoroughly kneaded and mixed, the paste is held for about 30 minutes and then formed into a loaf by using either a chewing gum extruder pump and guillotine or a loaf forming machine which forms loaves by calendaring and cutting. The loaves are typically ½ inch to 1½ inch thick, 1 to 1½ feet wide and about 18 inches long. After these loaves are formed, they may be cooled and otherwise prepared for subsequent handling.

Figure 1:
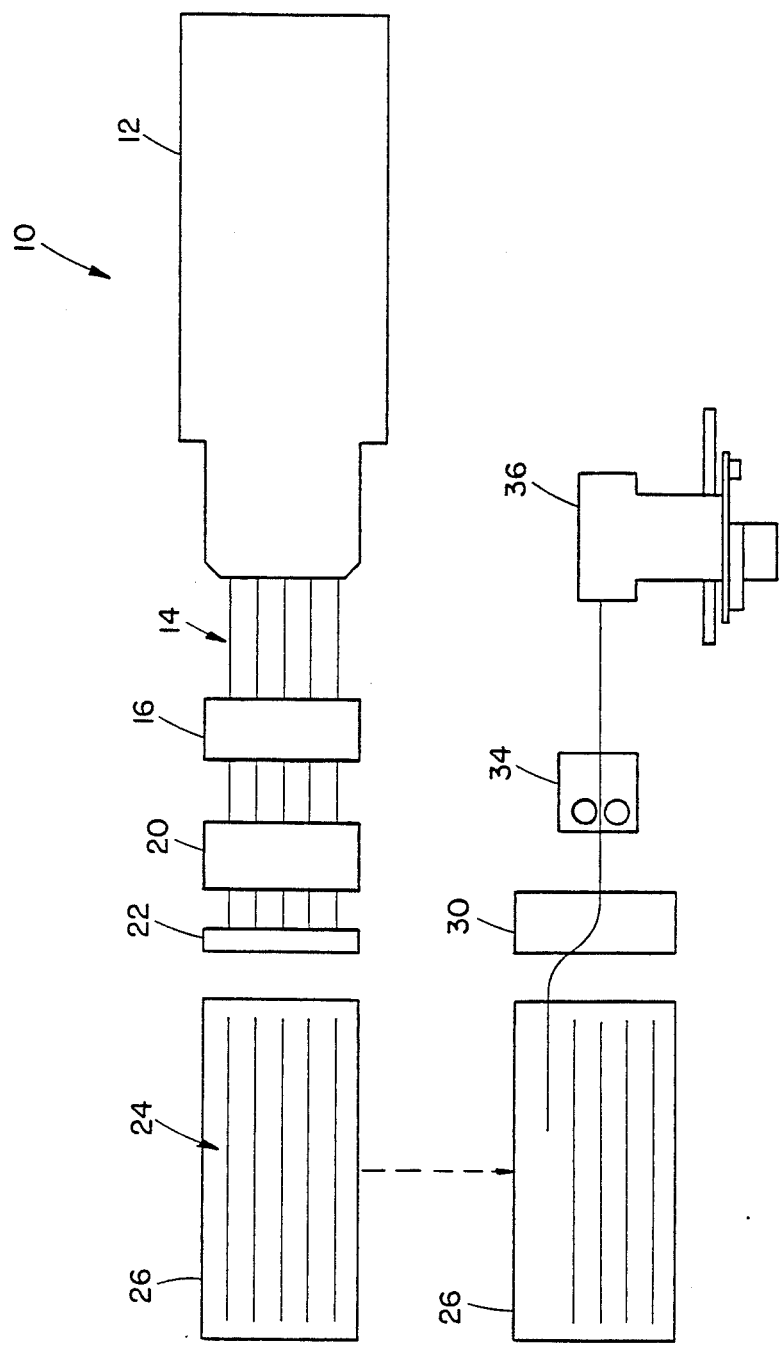
FIG. 1 is a schematic diagram showing a prior art process for handling chewing gum.

FIG. 1 shows a prior art system 10 for forming a multitude of small, individually wrapped pieces of gum from the gum loaves. The gum loaves are fed to extruder 12, which extrudes a plurality of continuous ropes 14 of gum. These ropes are extruded onto a conveyor or belt (not shown) that carries the ropes past a metal detector 16, a powder applicator 20 and a slicer or guillotine 22, which slices the ropes into segments 24. The rope segments are collected on racks, one of which is referenced at 26, and these racks are carried or transported by a worker to an adjacent area. At this adjacent area, these rope segments are reconnected together at station 30 to form a new, continuous rope and this new rope is fed through a pre-sizer 34, which changes the vertical cross-sectional shape of the rope from circular to square or rectangular. From the pre-sizer, the rope 32 is fed to a wrapping unit 36, which cuts the rope into a multitude of small pieces and then wraps each piece. With this system, one extruder 12 can discharge enough gum product to supply a multitude of wrapping units 36, such as up to 8 or 10 wrapping units.

Figure 2:
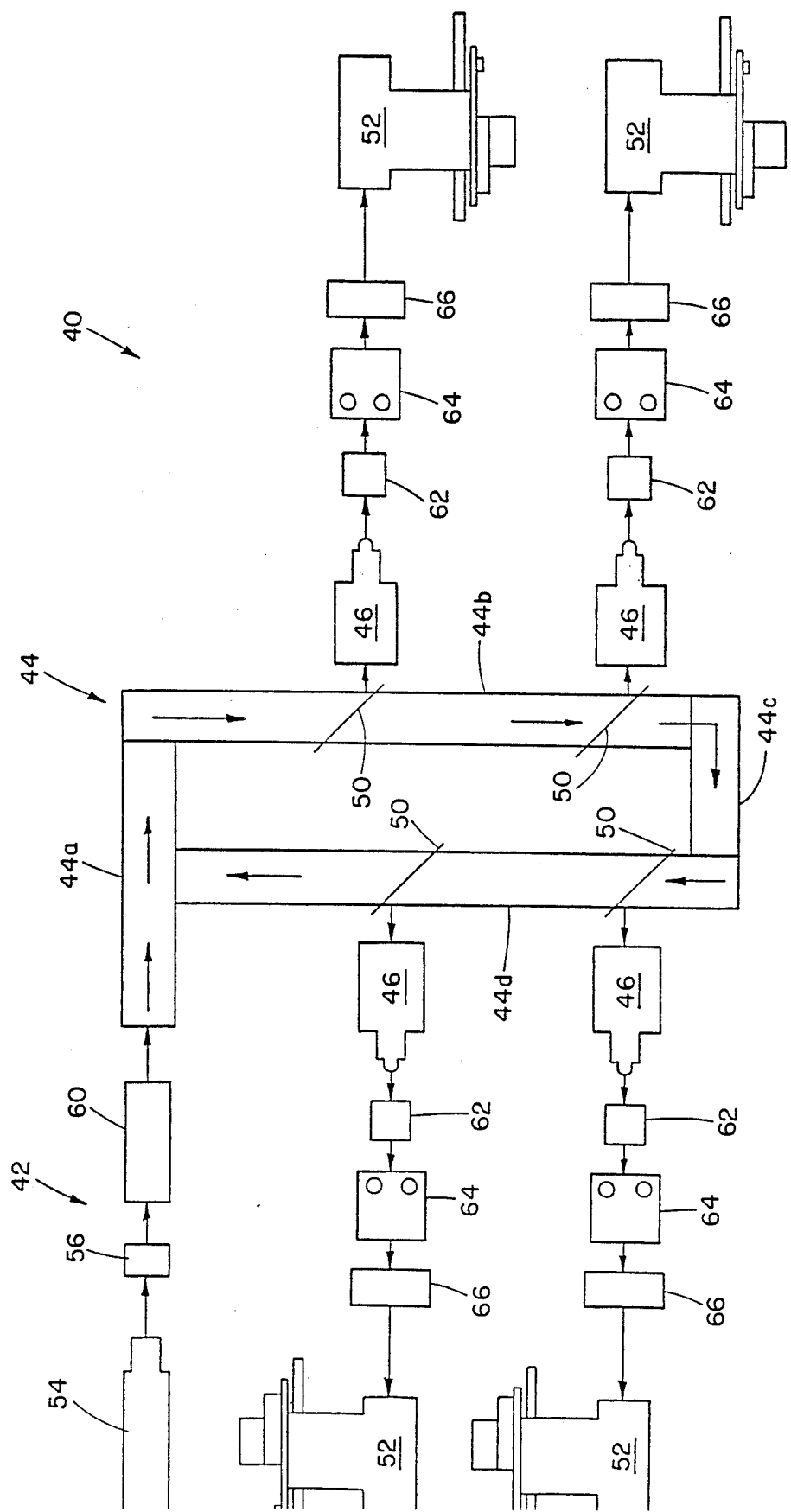
FIG. 2 is a schematic diagram illustrating a gum handling system and method according to the present invention.

FIG. 2 outlines the system 40 of the present invention. This system includes segment forming means 42, conveyor means 44, a plurality of extruders 46, extruder feed means 50, and a plurality of gum wrapping units 52. Preferably, segment forming means 42 includes primary extruder 54, slicer 56 and cooling tunnel 60; and system 40 further includes a plurality of powder applicators 62, pre-sizers 64, and metal detectors 66.

Gum loaves or any other suitable type of bulk gum composition or mass are fed to extruder 54 which extrudes the gum into a multitude of continuous, primary ropes, each of which has a diameter of about one inch. Slicer 56 cuts each of these primary ropes into a multitude of segments, each of which is about 3 inches long; and these gum segments are passed through optional cooling tunnel 60, which may be used to cool the gum, for instance, to a temperature slightly below the ambient temperature. From the cooling tunnel, the gum segments are fed onto conveyor means 44, which carries the gum segments along a path. Any suitable means such as a conveyor or belt may be used to carry the gum from extruder 54, past slicer 56, through tunnel 60, and to conveyor 44.

Extruders 46 are located along the conveyor means 44 to receive the gum segments therefrom, and a respective one feeding means 50 is located adjacent each extruder 46 to feed gum thereinto from the conveyor means. Each extruder 46 extrudes a secondary, continuous rope of gum, which preferably is passed through a powder applicator 62, a presizer 64 and a metal detector 66. This extrusion process raises the temperature of the gum, and preferably the temperature of the gum fed to the extruders 46 is controlled so that the temperature of the gum is approximately ambient temprature as it is discharged from those extruders. From the metal detectors 66, each secondary rope of gum is fed to a respective one wrapping unit 52, which cuts the rope into small pieces and individually wraps each such piece.

Any suitable conveyor means 44 may be used in the practice of this invention. Preferably, the conveyor means forms a closed loop to continuously move gum segments around a closed path, and so that segments of gum on the conveyor means that are not fed into any of the extruders 46 on one pass around the conveyor means, are recirculated around that conveyor means. For instance, the conveyor means may comprise four legs 44a–d, with each leg comprising an endless belt; and each leg may form a respective one side of a rectangle or square, with leg 44a also forming an extension portion that receives the gum segments from cooling tunnel 60.

Figure 4:
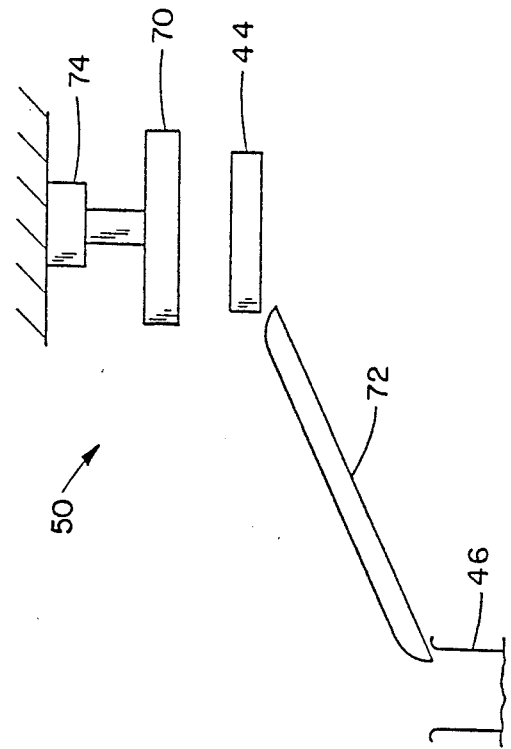
FIG. 4 is a side view of FIG. 3, taken along line IV-IV thereof.
Figure 3:
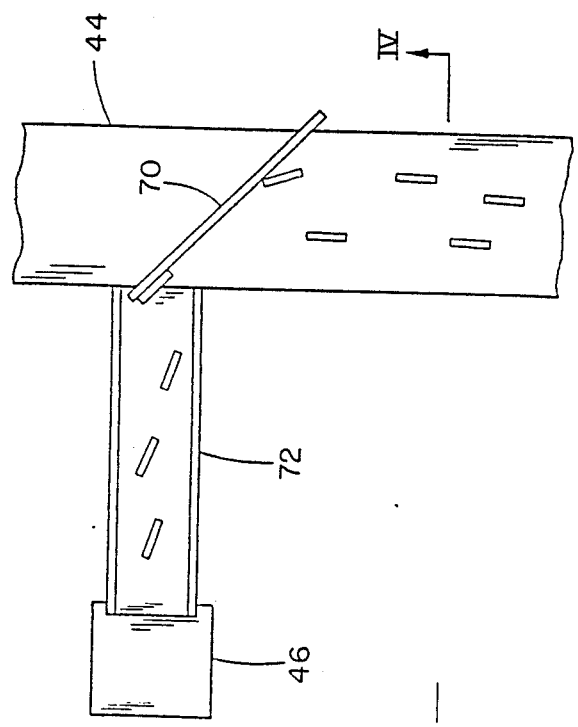
FIG. 3 shows in greater detail one portion of the system of FIG. 2.

Any suitable mechanisms 50 may be employed to feed gum to extruders 46 from conveying means 44, and FIGS. 3 and 4 illustrate one such mechanism. With this arrangement each feeding means 50 comprises a diverter bar 70 supported for movement between engaged and disengaged positions. In the engaged position, the diverter bar guides gum segments on the conveyor means 44 into a feed chute 72 that, in turn, guides the gum segments into an inlet hopper of an adjacent extruder 46; and in the disengaged position, the diverter bar allows the gum segments on the conveyor means to move past that adjacent extruder.

Preferably, each diverter bar 70 is supported above the conveyor means 44 for upward and downward reciprocating movement, respectively, away from and toward the conveyor means. With this preferred embodiment, when the diverter bar is in its disengaged position, the bar is spaced above the conveyor means a distance sufficient so that the gum segments on the conveyor means pass underneath the diverter bar without contacting that bar; and when the diverter bar is in its engaged position, that bar is closely adjacent, but slightly spaced above, the conveyor means, and the diverter bar acts to push gum segments from the conveyor means into an adjacent extruder feed chute. The diverter bars are supported in any suitable way, and any acceptable means 74 such as an electric motor or a hydraulic or pneumatic cylinder may be used to move the diverter bars between their engaged and disengaged positions. Preferably, as shown in FIG. 3, each diverter bar is positioned, at least in its engaged position, so that the bar slants laterally across the conveyor means and extends slightly beyond the lateral edges of the conveyor means.

With particular reference to FIG. 4, preferably, conveyor means 44 is located above the inlet hoppers of extruders 46 so that the gum segments move into those hoppers from the conveyor means under the force of gravity. It may also be desirable to provide means (not shown) to vibrate feed chutes 72 to help insure that the gum segments move evenly and smoothly down those chutes.

Movement of each diverter bar 70 between its engaged and disengaged positions may be controlled by a sensor (not shown) that senses the amount or level of gum in the adjacent extruder. In particular, when the amount or level of gum in the adjacent extruder falls below a preset value, this sensor may activate motive means 74 to move the diverter bar into its engaged position to feed more gum to the extruder; and when the amount or level of gum in the extruder rises above a given value, this sensor may actuate motive means 74 to move the diverter bar back into its disengaged position. For example, such a sensor may comprise a photosensor located at a given height on or in the feed hopper of the extruder. This same sensor may also be used to control the vibration means for the feed chute to the extruder; and more specifically, to activate and deactivate that vibration means, respectively, as the diverter bar moves toward or into its engaged and disengaged positions.

Any suitable gum extruder may be used as primary extruder 54, although preferably, as mentioned above, this extruder extrudes multiple continuous ropes of gum. Likewise, conventional gum slicers, cooling tunnels, powder applicators, metal detectors, pre-sizers, and wrapping units may be used in system 40. Numerous such devices are well known to those of ordinary skill in the art, and it is unnecessary to describe these devices herein in detail.

Similarly, any suitable extruders may be used as secondary extruders 46. However, FIGS. 5–11 show a preferred secondary extruder 80, which generally comprises support means 82, extruder head 84, extruder screw 86 and screw drive means 90. The extruder further comprises hopper 92, feed assist roller 94, roller mounting assembly 96, and roller drive means 100. Preferably, screw drive means 90 includes motor 102 and drive shaft 104; mounting assembly 96 includes mounting plate 106, roller shaft 110, and bearings 112 and 114; and roller drive means 100 includes motor 116 and transmission means 120.

Support means 82 provides the necessary support for the other parts of extruder 80. Any suitable support means may be used in the practice of this invention and, for instance, the support means may comprise an appropriate frame or stand. Preferably, though, support means 82 has a box-shape and also forms a protective enclosure or housing for motor 102 and drive shaft 104. In this case it is desirable to provide this housing with a removable section or portion such as a removable top, to provide access to motor 102 and drive shaft 104. Support means 82 may be constructed of any suitable material such as sheet metal or aluminum.

Extruder head 84 is connected to and is supported by support means 82, and the extruder head forms tubular passageway 122 having an inlet 122a for receiving food material and an outlet 122b for discharging the food material. Preferably, extruder head 84 is connected to, and extends horizontally forward from, a front side of support means 82; and passageway 122 has a generally uniform, circular cross-section, and defines a horizontal extruder axis 84a. A suitable die or nozzle (not shown) may be mounted on or placed in the front end of extruder head 84, over the outlet of tubular passageway 122, to form the gum material discharged therethrough into a particular shape. Extruder head 84 may be made of any suitable material such as a cast metal, and preferably the extruder head is securely bolted to support means 82. A back end of the extruder head forms a central opening 84b to receive drive shaft 104, and a seal 124 may be disposed between the back end of the extruder head and support means 82 to prevent food material from leaking out through the interface between the extruder head and the support means.

Hopper 92 is provided to receive and hold the gum material and to conduct that material into tubular passageway 122. More specifically, the hopper has an inlet 92a for receiving the gum material, an outlet 92b in communication with inlet 122a of tubular passageway 122 for conducting the gum material thereinto, and an internal passage 92c for holding the gum material and conducting that material from inlet 92a to outlet 92b. With the embodiment of the invention shown in FIGS. 5–11, hopper 92 is integrally molded with extruder head 84 and extends directly upward therefrom, and the hopper has a generally uniform, rectangular horizontal cross-section. Other arrangements may be used, though, and, for example, the hopper may be bolted to the extruder head.

Extruder screw 86 is rotatably disposed in tubular passageway 122, and drive means 90 is supported by support means 82 and connected to the extruder screw to rotate that screw to force the gum material through passageway 122. Any suitable drive means 90 may be employed on extruder 80, and the drive means may be connected to the extruder screw in any appropriate manner. With the embodiment of extruder 80 shown in the drawings, a conventional electric motor 102 is securely connected to and located inside support means 82, and drive shaft 104 is operatively connected to the motor such that the motor rotates the drive shaft. Drive shaft 104 extends forward from motor 102, through a forward opening in the support means, and into or through back opening 84b of extruder head 84.

Preferably, the forward end of drive shaft 104 is rotatably supported by assembly 126, which in turn is securely supported by a front side of support means 82. Assembly 126 comprises a thrust bearing 130, which extends around the drive shaft and directly engages a back side of a shoulder 104a on the forward portion of the drive shaft. Bearing 130 is housed in and supported by a bearing housing 132, and this housing is securely welded or bolted to a load transfer plate 134, which itself is bolted or welded to the front side of support means 82.

Figure 5:
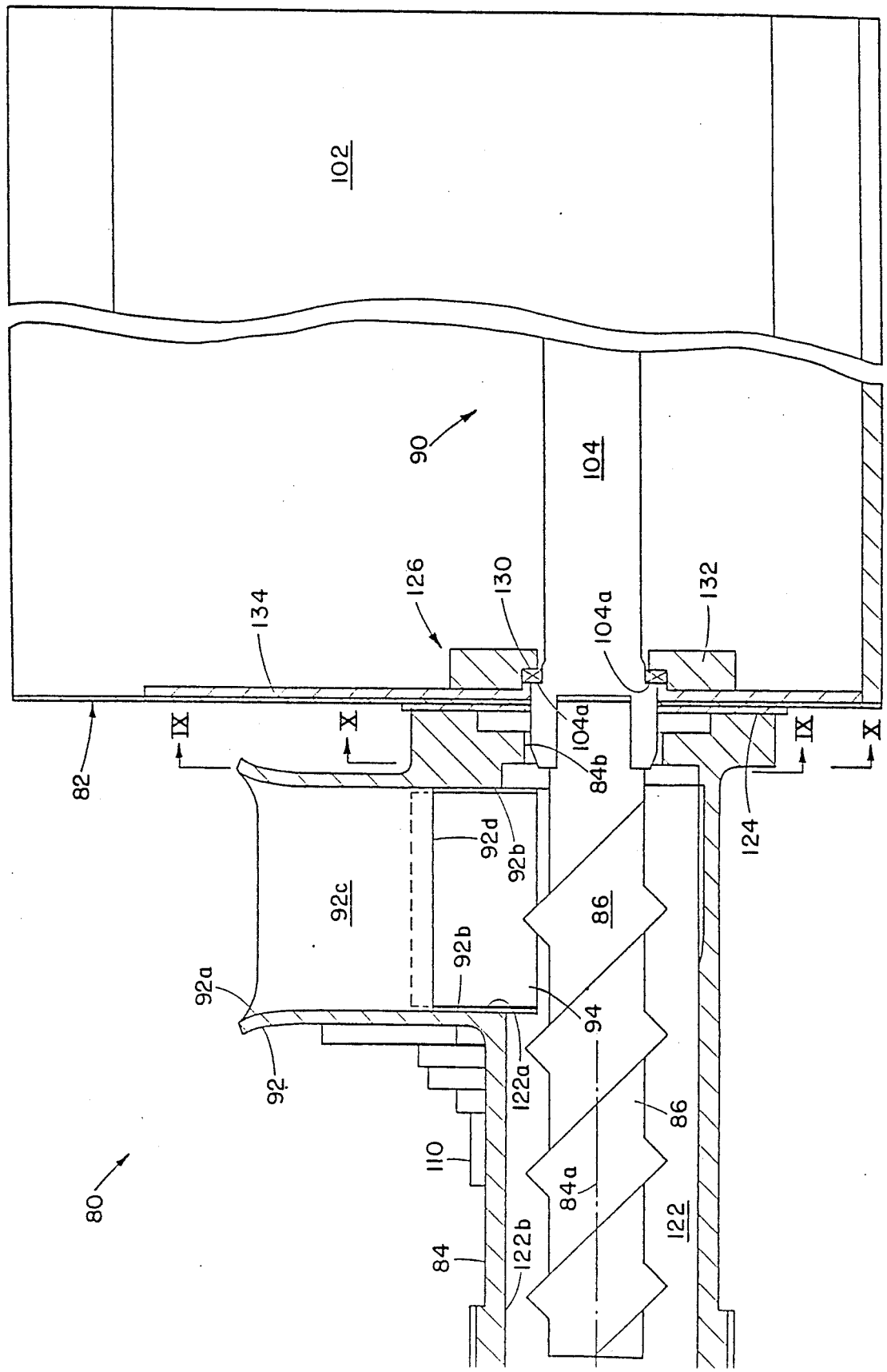
FIG. 5 is a cross-sectional view of an extruder of the gum handling system.

Extruder screw 86 is rotatably supported in passageway 122 and is connected to drive shaft 104 in any suitable way, and preferably the extruder screw is supported for rotation about the axis 84a of the extruder head 84. As illustrated in FIG. 5, the extruder screw is securely connected to the forward end of the drive shaft so that this shaft both provides the necessary support for the extruder screw, and rotates that screw unitarily with the drive shaft. If desired, however, additional support means may be provided for the extruder screw. As shown in FIG. 5, extruder screw 86 comprises an elongated cylindrical body having a uniform outside diameter, and a land helically extending around the screw body. The pitch of the land varies from the back to the front of the screw; and adjacent land convolutions are spaced apart about 3 ⅝ inches at the back end (the right end as viewed in FIG. 5) of the screw, and about 1 ⅝ inches at the front end (the left end as viewed in FIG. 5) of the screw. As will be appreciated by those of ordinary skill in the art, other extruder screw shapes and designs may be employed in the extruder 80.

With particular reference to FIGS. 5 and 8 hopper 92 forms a supplemental opening 92d adjacent a rearward portion of one side of extruder screw 86, and feed assist roller 94 is rotatably supported on extruder 80 and extends partly through the supplemental opening and into the interior of the hopper. Supplemental opening 92d is formed by a lower side portion of hopper 92, and feed assist roller 94 is supported outside of the hopper, closely adjacent the supplemental opening so that a portion of the assist roller extends through that opening. Preferably, feed assist roller 94 extends across both hopper outlet 92b and passageway inlet 122a and to a position closely adjacent extruder screw 86. Furthermore, preferably roller 94 is supported for rotation about an axis parallel to the axis 84a of the extruder head 84, and supplemental opening 92d has a generally rectangular shape.

With particular reference now to FIGS. 6 and 7, feed assist roller 94 is supported by mounting assembly 96. More specifically, mounting plate 106 is securely bolted to a front side of hopper 92 and, as viewed in FIG. 6, the mounting plate extends downwardly and leftwardly of the hopper. The lower, leftward portion of the mounting plate forms a through opening, and flange bearing 112 is bolted to a front side of the mounting plate, over this through opening. Rear bearing block 114 is securely connected to extruder head 18, rearward of supplemental opening 92d, and the bearing block 114 seats in a recess 84c (shown in FIG. 9) formed in a back flange portion of the extruder head. Roller support shaft 110 axially extends between and is rotatably supported by flange bearing 112 and bearing block 114, and preferably the axis of shaft 110 is parallel to the axis 84a of extruder head 84. A front portion of shaft 110 is fixed to an inner race 112a of bearing 112 to hold the shaft against axial or thrust movement.

Roller 94 has a hollow, tubular shape and is mounted on shaft 110 in a relatively close fit therewith, and the roller is connected to shaft 110 for unitary rotation with this shaft. Preferably, the length of the feed assist roller is slightly less than the length of supplemental opening 92d, and the feed assist roller extends through this opening with the front and backsides of the roller closely adjacent the front and back edges, respectively, of the supplemental opening. The diameter of roller 94 is greater than the width or height of supplemental opening 92d; however, the feed assist roller is positioned so that upper and lower surfaces of the roller are closely adjacent, but slightly spaced from, the upper and lower edges, respectively, of the supplemental opening.

Supplemental or roller drive means 100 is connected to the feed assist roller to rotate this roller to facilitate moving the gum material from hopper 92 and into passageway 112 of extruder head 84, and any suitable drive means 100 may be employed to rotate roller 94. For example, with reference to FIG. 9, second motor 116, which may be any conventional electric motor, is securely connected to the outside of support means 82 and is drivingly connected to roller shaft 110 by transmission means, which preferably includes sprockets 136 and 140 and chain 142. Sprocket 136 is mounted on an output shaft of motor 116 for rotation with that shaft, sprocket 140 is mounted on roller shaft 110 for rotation therewith, and chain 142 is drivingly mounted on both sprockets 136 and 140. In use, motor 116 rotates its shaft, which in turn rotates sprocket 136, and this drives chain 142 around sprocket 136. This causes chain 142 to rotate sprocket 140, and this sprocket rotates shaft 110 and feed assist roller 94. Alternatively, a suitable transmission means (not shown) may be used to connect motor 102 or drive shaft 104 to roller shaft 110 so that motor 102 is also used to rotate feed assist roller 94, eliminating the need for a separate motor to drive the feed assist roller. It may be preferred, but not necessary, to rotate the feed assist roller at the same rotational speed as extruder screw 86, and it is preferred to rotate roller 94 clockwise as viewed in FIG. 8, and in a direction opposite to the direction of rotation of extruder screw 86.

In operation, gum material is fed into and collected in hopper 92, and drive means 90 and 100 rotate extruder screw 86 and feed assist roller 94, respectively. The gum material passes from the hopper and into tubular passageway 122, with the feed assist roller insuring that the gum material does not become blocked adjacent the lower portion of the hopper and insuring that the gum material flows smoothly and evenly into the tubular passageway. The rotation of extruder screw 86 forces the food material forward through the tubular passageway and then outward from the extruder head.

As roller 94 rotates, material in hopper 92 may adhere to the roller, and it is desirable to prevent this material from being carried out of the feed hopper and scraped off roller 94 outside of the feed hopper. For this reason, with particular reference to FIG. 8, preferably the vertical distance or space between the roller and the bottom horizontal edge of opening 92d is less than the vertical distance or space between the roller and the top horizontal edge of opening 92d. In this way, as roller 94 rotates, the bottom edge of opening 92d scrapes material off the roller while that material is still inside the feed hopper. Any material remaining on the feed assist roller is carried around by that roller past the upper edge of opening 92d and back into the feed hopper without being scraped of the roller, outside the feed hopper, by the top edge of opening 92d.

System 10 works very well with conventional chewing gum materials; and, for example, several suitable chewing gum formulations that may be used in the practice of this invention are described in detail in U.S. Patents 4,352,825 and 4,399,154. In particular, the chewing gum formulation may include a gum base, a premixed recrystallized combination at least two sweetners, including solids and liquid sweetners, which preferably include sucrose and/or sorbitol and/or hydrogenated starch hydrolysate, and high fructose syrup alone or together with liquid glucose, hydrogenated starch, hydrolysate syrup, corn syrup, sorbitol syrup and/or invert sugar, in the recrystallized mixture, and flavors, softners and other conventional chewing gum ingredients. The amount of sorbitol in the chewing gum formulation may be increased to increase the hardness and to improve the handleability of the chewing gum.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for processing a chewing gum composition comprising the steps of:
   forming a mass of the gum composition;
   cutting said mass into a multitude of segments;
   feeding the segments onto a conveyor means;
   feeding gum segments from the conveyor means into a plurality of extruders;
   extruding a rope of gum from each extruder; and
   cutting each rope into a multitude of pieces, and wrapping each piece.

2. A method according to claim 1, wherein the conveyor means forms a closed, endless path, and the step of feeding gum segments from the conveyor means into the extruders includes the steps of:
   feeding selected gum segments from the conveyor means into the extruders; and
   recirculating around the conveyor means, gum segments not fed to any of the extruders.

3. A method according to claim 2, wherein the step of feeding selected gum segments into the extruders comprises the step of:
   sensing the amount of gum in each extruder; and
   when the amount of gum in any one of the extruders falls below a given value, diverting gum from the conveyor means and into said one extruder.

4. A method according to claim 1, wherein the step of feeding gum segments from the conveyor means and into the extruders further includes the step of diverting gum from the conveyor means and into a plurality of feed chutes, each feed chute directing gum segments to a respective one of the extruders.

5. A method according to claim 4, further including the step of vibrating the feed chutes to facilitate the movement of the gum segments therealong.

6. A method according to claim 1, further including the steps of:
   cooling the gum segments to a temperature slightly below ambient temprature prior to feeding the gum segments to the extruders; and the extruding step includes the step of raising the temperature of the gum segments as said segments are extruded into the ropes.

7. A method according to claim 6, wherein the cooling step includes the step of cooling the gum segments to a temperature slightly below ambient temperature prior to feeding the gum segments onto the conveyor means.

8. A method according to claim 1, wherein the step of cutting said mass into the multitude of segments includes the steps of:

extruding the mass into a multitude of primary ropes; and cutting each primary rope into a multitude of segments.

9. A method according to claim 8, wherein each segment has a tubular shape with a diameter of about one inch, and a length of about 3 inches.

10. A method according to claim 1, further including the steps of:

applying a powder to each rope; and reshaping each rope prior to cutting the rope.

* * * * *